(12) United States Patent
Mendel et al.

(10) Patent No.: US 11,715,496 B2
(45) Date of Patent: Aug. 1, 2023

(54) SYSTEMS AND METHODS FOR PROCESSING VIDEO DATA

(71) Applicants: Christopher Kyle Mendel, Houston, TX (US); Jay Lawrence Cox, Trenton, MI (US); Peter Keierleber, Sugar Land, TX (US); James Perry Redding, Jr., Spring, TX (US)

(72) Inventors: Christopher Kyle Mendel, Houston, TX (US); Jay Lawrence Cox, Trenton, MI (US); Peter Keierleber, Sugar Land, TX (US); James Perry Redding, Jr., Spring, TX (US)

( * ) Notice: Subject to any disclaimer, the term of this patent is extended or adjusted under 35 U.S.C. 154(b) by 98 days.

(21) Appl. No.: 17/365,101

(22) Filed: Jul. 1, 2021

(65) Prior Publication Data

US 2023/0005509 A1    Jan. 5, 2023

(51) Int. Cl.
| | |
|---|---|
| *G11B 27/06* | (2006.01) |
| *G11B 27/036* | (2006.01) |
| *G06F 16/783* | (2019.01) |
| *G11B 27/36* | (2006.01) |
| *G11B 27/034* | (2006.01) |

(52) U.S. Cl.
CPC ............ *G11B 27/06* (2013.01); *G06F 16/783* (2019.01); *G11B 27/034* (2013.01); *G11B 27/036* (2013.01); *G11B 27/36* (2013.01)

(58) Field of Classification Search
CPC ..... G11B 27/06; G11B 27/034; G11B 27/036; G11B 27/36; G06F 16/783
See application file for complete search history.

(56) References Cited

U.S. PATENT DOCUMENTS

2019/0312922 A1* 10/2019 Jing .................... H04L 43/0817
2019/0320002 A1* 10/2019 Qin .................... H04N 21/8456

* cited by examiner

*Primary Examiner* — Girumsew Wendmagegn
(74) *Attorney, Agent, or Firm* — Burris Law, PLLC (57) ABSTRACT

A method includes obtaining video data for a first set of video files, generating processing job data for a first video processing job based on the video data, identifying a first processing server having a capacity for handling the first video processing job, sending, to the first processing server, the processing job data for the first video processing job and a first request to validate the video data, receiving, from the first processing server, validation testing results in connection with the first set of video files, determining first transcoding parameters for the first set of video files based on the validation testing results and output requirements data for the first video processing job, and sending, to the first processing server, a second request to generate an output video based on the first set of video files, the second request including an indication of the first transcoding parameters.

18 Claims, 6 Drawing Sheets

SYSTEMS AND METHODS FOR PROCESSING VIDEO DATA

TECHNICAL FIELD

The present disclosure relates to data processing and, in particular, to systems and methods for automating video data processing for large quantities of video files.

BACKGROUND

The statements in this section merely provide background information related to the present disclosure and may not constitute prior art.

Advances in mobile and video technologies now enable capture of video data across many different devices, platforms, and file formats. Videos can be recorded using cameras on various different types of devices, and recorded videos can be saved (e.g., stored in memory) or streamed for consumption by viewers. Digital video files may vary in properties such as file format, frame rate, bit rate, video dimensions, file size, etc.

Video files may sometimes be processed in bulk. By way of example, video editing software may be used to splice together multiple input video files of the same format (i.e., encoding format) to generate a single output video. When the input files all have the same or largely the same video properties, a standard batch processing solution may be sufficient for handling batch operations such as splicing, encoding, and the like. However, a standard batch solution is generally not suitable for video processing jobs involving input files that vary substantially in video properties and complex requirements for output videos.

SUMMARY

This section provides a general summary of the disclosure and is not a comprehensive disclosure of its full scope or all of its features.

In an aspect, a computing device is disclosed. The computing device includes a processor, a communications module coupled to the processor, and a memory coupled to the processor. The memory stores instructions that, when executed, configure the processor to: obtain video data for a first set of video files; generate processing job data for a first video processing job based on the video data for the first set of video files; identify a first processing server having a capacity for handling the first video processing job; send, to the first processing server, the processing job data for the first video processing job and a first request to validate the video data for the first set of video files; receive, from the first processing server, validation testing results in connection with the first set of video files; determine first transcoding parameters for the first set of video files based on the validation testing results and output requirements data for the first video processing job; and send, to the first processing server, a second request to generate an output video based on the first set of video files, the second request including an indication of the first transcoding parameters.

In some implementations, the first transcoding parameters may comprise settings for use in performing at least one of: splicing together two or more of the video files of the first set; or converting at least one of the video files of the first set to a target format.

In some implementations, when the processor is configured to obtain the video data for the first set of video files, the processor is further configured to: monitor one or more data stores configured for storing video files; detect a trigger event in connection with the one or more data stores; and in response to detecting the trigger event, retrieve video data associated with the first set of video files from the one or more data stores.

In some implementations, when the processor is configured to detect the trigger event, the processor is further configured to detect start of an upload of at least one video file to the one or more data stores.

In some implementations, when the processor is configured to detect the trigger event, the processor is further configured to detect completion of the upload based on determining that total size of uploaded files remains substantially constant for at least a defined length of time.

In some implementations, the validation testing results may comprise, for each of one or more of the video files of the first set, at least one of: video display resolution; video codecs; audio codecs; or video compression settings.

In some implementations, when the processor is configured to identify the first processing server, the processor is further configured to determine, for each of a plurality of remote computing systems, a current processing capacity of the remote computing system.

In some implementations, when the processor is configured to determine the current processing capacity of the remote computing system, the processor is further configured to send, to the remote computing system, a query for obtaining at least one of processing power or available memory associated with the remote computing system.

In some implementations, when the processor is configured to generate the processing job data, the processor is further configured to determine that the first set of video files is associated with a same processing job based on at least one of: metadata associated with the video files of the first set; file names of the video files of the first set; or an inventory list identifying constituent video files of a desired output video.

In some implementations, the instructions, when executed, may further configure the processor to: determine, based on the validation testing results, that at least one of the video files of the first set is defective; and in response to determining that the at least one video file is defective, terminate the first video processing job.

In another aspect, a computer-implemented method is disclosed. The method includes: obtaining video data for a first set of video files; generating processing job data for a first video processing job based on the video data for the first set of video files; identifying a first processing server having a capacity for handling the first video processing job; sending, to the first processing server, the processing job data for the first video processing job and a first request to validate the video data for the first set of video files; receiving, from the first processing server, validation testing results in connection with the first set of video files; determining first transcoding parameters for the first set of video files based on the validation testing results and output requirements data for the first video processing job; and sending, to the first processing server, a second request to generate an output video based on the first set of video files, the second request including an indication of the first transcoding parameters.

In yet another aspect, a non-transitory computer readable storage medium is disclosed. The computer readable storage medium contains instructions thereon which, when executed by a processor, configure the processor to: obtain video data for a first set of video files; generate processing job data for a first video processing job based on the video data for the first set of video files; identify a first processing server having a capacity for handling the first video processing job; send, to the first processing server, the processing job data for the first video processing job and a first request to validate the video data for the first set of video files; receive, from the first processing server, validation testing results in connection with the first set of video files; determine first transcoding parameters for the first set of video files based on the validation testing results and output requirements data for the first video processing job; and send, to the first processing server, a second request to generate an output video based on the first set of video files, the second request including an indication of the first transcoding parameters.

Further areas of applicability will become apparent from the description provided herein. It should be understood that the description and specific examples are intended for purposes of illustration only and are not intended to limit the scope of the present disclosure. Other example embodiments of the present disclosure will be apparent to those of ordinary skill in the art from a review of the following detailed descriptions in conjunction with the drawings.

BRIEF DESCRIPTION OF THE DRAWINGS

Reference will now be made, by way of example, to the accompanying drawings which show example embodiments of the present application and in which.

Like reference numerals are used in the drawings to denote like elements and features. The drawings described herein are for illustration purposes only and are not intended to limit the scope of the present disclosure in any way.

DETAILED DESCRIPTION OF EXAMPLE EMBODIMENTS

The following description is merely exemplary in nature and is not intended to limit the present disclosure, application, or uses. It should be understood that throughout the drawings, corresponding reference numerals indicate like or corresponding parts and features.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The advances in mobile and video technologies have made video content creation readily accessible for the masses. Videos may be created using a wide range of device types (e.g., digital cameras, mobile phones, and the like). As a result, video files may vary in properties such as file format, frame rate, bit rate, video dimensions, file size, etc. In particular, videos that are generated on different devices or for different purposes may vary substantially in their video properties.

Certain applications may require bulk processing of video files. As a specific example, court proceedings may have defined requirements for compression settings, video resolutions, and/or output formats for video files that are admissible as evidence. The requirements may need to be met in order for the video files to be used with courtroom-approved software and/or hardware for playing video to a jury. Video recordings of depositions, including remotely recorded testimonies, may be received from a wide range of different sources (e.g., different camera models). The recordings may thus vary in video properties such as video resolution, compression scheme, and the like. Further, the recordings may comprise one or more sets of video files that relate to the same subject matter (e.g., a single testimony). For example, a single testimony may result in creation of multiple video files due to storage limitations on the recording camera, etc. The video recordings may need to be spliced together to generate output videos that are suitable for presenting in courtrooms.

Traditional video processing solutions are not properly equipped for handling batch operations for video files that vary in video properties. In particular, due to complexities relating to compression formats, requirements for proper splicing, and verification of input video quality and settings, standard encoding software is generally insufficient for batch processing of large collections of videos. Instead, the generation of output videos (e.g., for use in courtrooms) requires extensive manual intervention for collecting video recordings, splicing the videos together, determining compression formats and resolutions, and configuring a video transcoding device to operate according to parameters that align with the output video requirements.

Various technical solutions for batch processing of video files that overcome the aforementioned challenges are described in the present disclosure.

Figure 1:
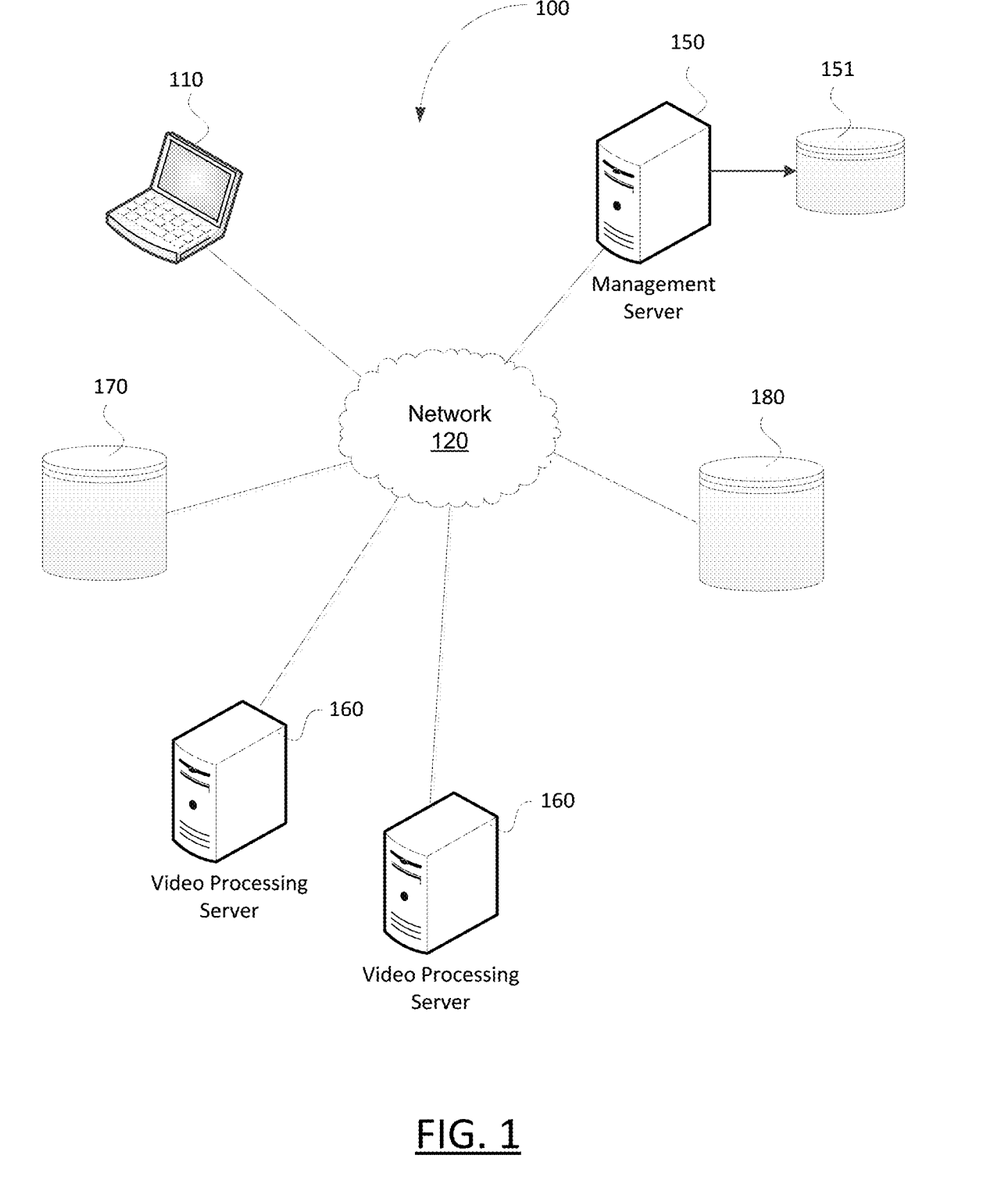
FIG. 1 is a schematic diagram illustrating an operating environment of an example embodiment.

FIG. 1 illustrates an exemplary computing environment 100 consistent with certain disclosed embodiments. As shown in FIG. 1, the computing environment 100 may include one or more client devices 110, a management server 150, a database 151 associated with the management server 150, one or more video processing servers 160, an input videos data store 170, a completed jobs data store 180, and a communications network 120 connecting one or more of the components of computing environment 100.

As illustrated, a management server 150 (which may also be referred to as a server computing system) and client device 110 communicate via the network 120. In at least some embodiments, the client device 110 is a computing device. The client device 110 may take a variety of forms including, for example, a mobile communication device such as a smartphone, a tablet computer, a wearable computer such as a head-mounted display or smartwatch, a laptop or desktop computer, or a computing device of another type. The client device 110 is associated with a specific entity, such as an individual or an organization. The client device 110 may store software instructions that cause the client device to establish communications with the management server 150 and, in some embodiments, one or more of the video processing servers 160, the input videos data store 170, or the completed jobs data store 180.

In one form, the management server 150 is a computing system. More specifically, the management server 150 implements a system for automatically handling video processing jobs. A video processing job refers to the production of custom work based on processing one or more video files. The custom work may, for example, be an output video that is produced based on one or more input video files. A processing job involves defined tasks (or operations) that are performed in order to produce an output (or "complete" the job).

In one form, the management server 150 may receive requests to handle video processing jobs from multiple different entities and manage the operations for completing the requested video processing jobs. The requests may be received, for example, via a user interface associated with the management server 150. That is, a user interface may be provided (e.g., on the client device 110) for requesting and/or accessing video processing jobs to be handled by the management server 150. A request may indicate various information about a video processing job. For example, a request may include identifying information about the requesting entity, description of the input video files, an indication of a location (e.g., a data store) where the input video files are stored/uploaded, and requirements data for output video products. The management server 150 may be configured to update the user interface based on information about the requested video processing jobs.

In one form, the computing environment 100 includes at least one video processing server 160. In one form, the video processing server 160 is a computing system. More specifically, the video processing server 160 is configured to perform various processing operations in connection with video files that are associated with one or more video processing jobs. The management server 150 interfaces with the one or more video processing servers 160. In particular, the management server 150 may query a set of video processing servers 160 to identify a server that has available processing power and memory capacity to process a video processing job. Upon identifying a suitable one of the video processing servers 160 for a particular job, the management server 150 assigns the job to the identified server 160 for processing. The identified server 160 then performs one or more defined operations, such as video splicing, transcoding, etc., in connection with the assigned job based on the video files that are associated with the job.

In addition to editing and converting video files, the video processing servers 160 may also be configured to perform validation testing of the video files. That is, the video processing servers 160 may be configured to test video assets (the terms "video files" and "video assets" are used interchangeably herein) for problems and/or errors. In performing validation testing, the video processing server 160 may obtain various information about the video files. In particular, the video processing server 160 may ascertain video properties, such as resolution, length, compression format, etc., of the video files. The results of the validation testing may be communicated, for example, to the management server 150. Specifically, a video processing server 160 that is assigned a video processing job by the management server 150 may provide, to the management server 150, validation testing results for the video files that are associated with the assigned job.

The computing environment 100 includes an input videos data store 170. In some embodiments, the input videos data store 170 may be a database where input video files for video processing jobs are stored. For example, the input videos data store 170 may be one of a set of designated locations that the management server 150 monitors to detect an upload of video files for new processing jobs.

The computing environment 100 also includes a completed jobs data store 180. In some embodiments, the completed jobs data store 180 may be a database that stores output videos associated with video processing jobs. In particular, a video processing server 160 that completes a job may store the output video(s) in the completed jobs data store 180. The completed jobs data stores 180 may also store job description data associated with one or more video processing jobs. The job description data for a job may indicate, for example, number and identities of input video files, duration of the job, video splicing order, encoding format, and validation testing results for the input and/or output video files.

The client device 110, the management server 150, the video processing servers 160, the input videos data store 170 and the completed jobs data store 180 may be in geographically disparate locations. Put differently, the client device 110 may be remote from one or both of the management server 150, the video processing servers 160, the input videos data store 170 and the completed jobs data store 180. As described above, client device 110, the management server 150, the video processing servers 160 may be computing systems.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2A:
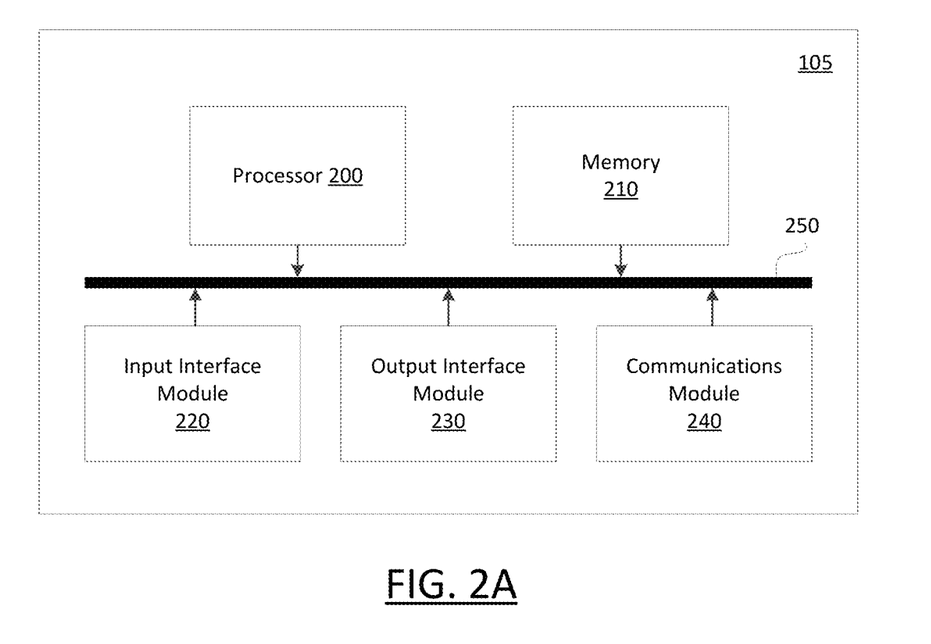
FIG. 2A is a high-level schematic diagram of an example computing device.

FIG. 2A is a high-level operation diagram of an example computing device 105. In some embodiments, the example computing device 105 may be exemplary of one or more of the client devices 110, the management server 150, or the video processing servers 160. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

In one form, the processor 200 is a hardware processor. The processor 200 may, for example, be one or more ARM, Intel x86, PowerPC processors or the like.

In one form, the memory 210 is configured to store and retrieve data. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system and as such may be administered by an operating system governing overall operation of the example computing device 105.

In one form, the input interface module 220 is configured to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

In one form, the output interface module 230 is configured to provide output signals. Some output signals may, for example, provide for a provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

In one form, the communications module 240 is configured to communicate with other electronic devices and/or various communications networks. For example, the communications module 240 is configured to have the example computing device 105 to send or receive communications signals. Communications signals may be sent or received according to one or more protocols or according to one or more standards. For example, the communications module 240 may is configured to have the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 is configured to have the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module 240 may be integrated into a communications chipset. The communications module 240 may include various transceivers, antennas, and other hardware for performing the functionality described herein.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
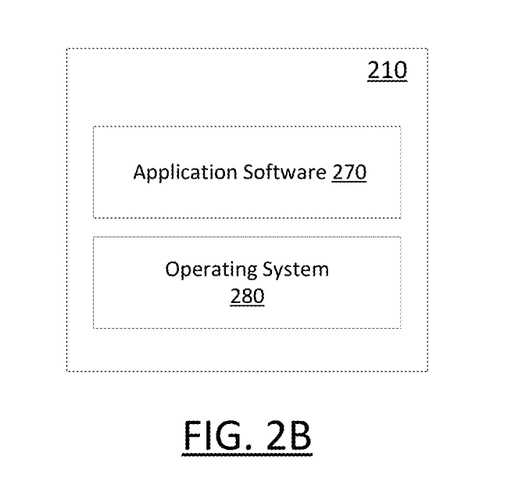
FIG. 2B is a schematic block diagram showing an example organization of software components stored in memory of the example computing device of FIG. 2A.

FIG. 2B depicts an example organization of software components stored in memory 210 of the example computing device 105. As illustrated these software components include an operating system 280 and application software 270.

In one form, the operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

In one form, the application software 270 adapts the example computing device 105, in combination with the operating system 280, to operate as a device performing particular functions.

Figure 3:
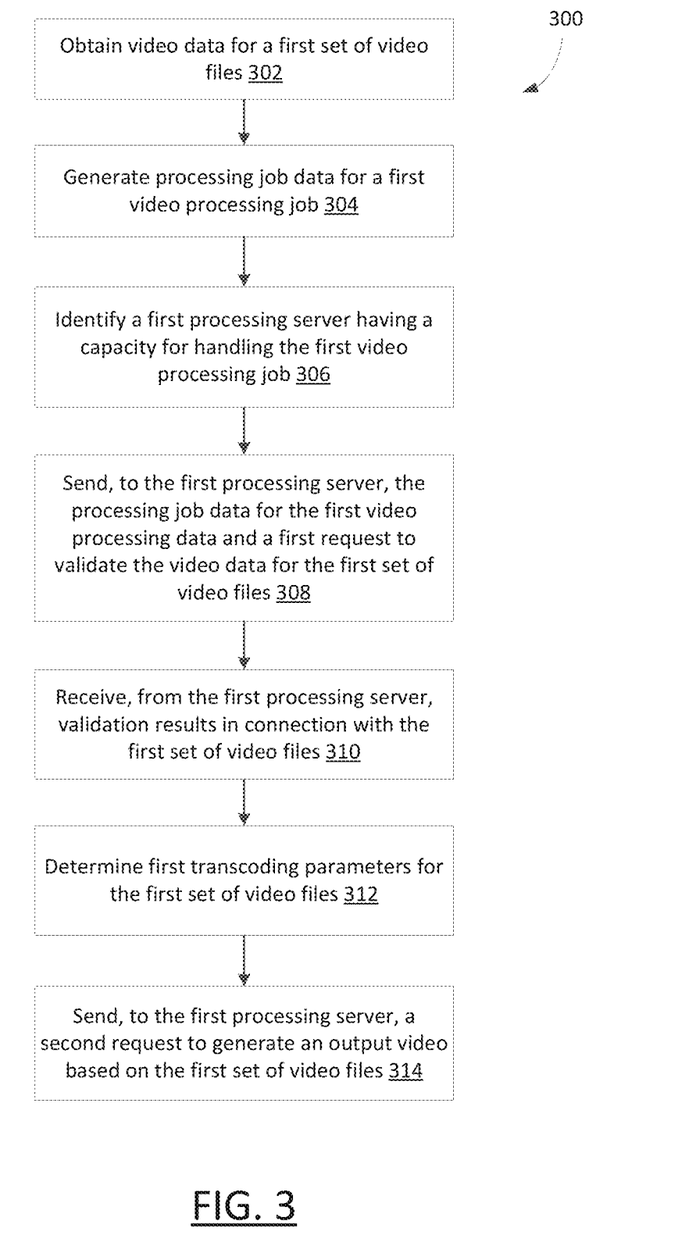
FIG. 3 shows, in flowchart form, an example method for managing video data processing of input video files associated with a video processing job.

Reference is made to FIG. 3, which shows, in flowchart form, an example method 300 for managing video data processing of input video files associated with a video processing job. As a specific and non-limiting example, the method 300 may be implemented as part of an automated process for processing, splicing, and transcoding combinations of video files that are part of a collection of videos. An output video that is produced based on the method 300 may comply with requirements of videos for one or more specific applications (e.g., video depositions). For example, an output video may have video properties that are consistent with specific video resolution and compression requirements.

Operations 302 and onward may be performed by one or more processors of a computing device such as, for example, the processor 200 (FIG. 2A) of one or more suitably configured instances of the example computing device 105 (FIG. 2A). In at least some embodiments, the method 300 may be performed by a computing system. In particular, a server (such as the management server 150 of FIG. 1, in some embodiments) that is configured to manage a plurality of video processing jobs may perform all or part of the operations of method 300.

A computing system implementing a video processing management service may receive a request to process a collection of video files to generate a suitable output video. The request may be communicated to the computing system, for example, via a user interface (e.g., a graphical user interface) that is accessible on a client device. For example, the user interface may be associated with an application, such as a mobile or web application, for requesting batch video processing services. The request may indicate, at least, information about video files of a first set of videos and desired/required video settings, such as video display resolution, encoding format, naming convention, etc. for the output video upon completion of the batch processing.

In operation 302, the computing system obtains video data for the first set of video files. The video data may comprise information about the video files, such as file names, video properties, and the like. The computing system may obtain the video data from the request data associated with the request to process the first set of video files. Additionally, or alternatively, the computing system may determine a data store (e.g., a database) associated with the video files and query the data store to obtain the video data. For example, the computing system may determine one or more databases that are designated as being configured to store input video files for batch processing and query the databases to retrieve video data for the video files identified in a processing request.

In operation 304, the computing system generates processing job data for a first video processing job based on the video data for the first set of video files. In particular, the computing system internally assigns at least a subset of the video files of the first set to a new video processing job and determines relevant processing job data for the video processing job. The video files that are to be assigned to a same processing job may be determined by identifying indicators associated with the video files that suggest that the video files are related. For example, the computing system may obtain file names of the video files of the first set and determine which of the video files are related based on common features (e.g., common strings) associated with the file names. Additionally, or alternatively, the computing system may determine grouping of the video files for assigning to the new processing job based on metadata associated with the video files or a listing (e.g., an inventory list) that identifies constituent video files of a desired output video.

In some embodiments, the computing system may generate display data associated with the new video processing job for presenting on a user interface. For example, display data including processing job data for the new job may be provided via a graphical user interface that is accessible on a client device. The display data may indicate, among others, job name, video category, total size of input video files, requesting entity, relevant timestamps (e.g., date created, last modified date, etc.) and current status of the job.

Once the video files are assigned to a new video processing job, the computing system identifies a processing server having a capacity for handling the video processing job in operation 306. The computing system determines various information about the video processing job, including number of files, maximum video size and total size, video content type, etc., and identifies a suitable server that can handle the video processing job. The video processing server may, in some embodiments, be one of a designated set of servers that are associated with the video processing management service. That is, the computing system may query only a defined set of video processing servers to determine suitability for the new video processing job.

In at least some embodiments, the computing system selects a server for the new processing job based on determining, for each of one or more processing servers, a current processing capacity of the server. In particular, the computing system may send, to each of the processing servers, a query for obtaining at least one of processing power or available memory associated with the server. The processing server for the new job may be selected in a number of different ways. For example, the computing system may select the first one of the processing servers that is determined to have capacity for handling the new video processing job. That is, as the computing system queries one or more processing servers, if a processing server is determined to have the required capacity, said processing server may be selected. As another example, the computing system may select the processing server that has the most available current processing capacity (i.e., in terms of available memory and/or processing power).

In operation 308, the computing system sends, to the selected processing server, the processing job data for the new video processing job. The computing system also sends a first request to validate the video data for the video files. In at least some embodiments, the computing system may send instructions to the selected processing server to obtain the video files associated with the video processing job. For example, the processing server may be instructed to download copies of the video files of the new processing job from a database that stores the files.

The first request may comprise instructions to perform validation testing of the video files for detecting any problems or errors associated with the files. The testing may be performed, for example, using specialized software that is locally available at the processing server or remotely located and accessible to the processing server. The processing server may obtain validation testing results based on the testing of the video files. The validation testing results indicate whether one or more of the video files have an associated problem/error. In particular, the validation testing results may identify any video files that are defective for containing errors that may adversely affect batch processing for the new processing job.

In at least some embodiments, the validation testing results may indicate video properties of video files associated with the new processing job. By way of example, the validation testing results may include indications of one or more of the following for a video file: video display resolution; video codecs; audio codecs; or video compression settings.

Upon completion of testing, the validation testing results are communicated to the computing system by the selected processing server. In operation 310, the computing system receives, from the processing server, validation results in connection with the first set of video files. The computing system then determines first transcoding parameters for the video files of the new processing job in operation 312. The first transcoding parameters broadly refer to settings that may be used for editing and/or converting video assets of a processing job. In at least some embodiments, the first transcoding parameters comprise settings for use in splicing together two or more video files of the processing job and/or converting at least one of the video files to a target format.

The first transcoding parameters are determined based on the validation testing results received from the selected processing server and output requirements data for the new video processing job. In particular, the computing system may determine video properties of the video files associated with the processing job and obtain video output requirements for the processing job. The video output requirements may be obtained, for example, by database queries to determine, at least, a video output format and delivery type required for the video processing job (or a specific application associated with the video processing job). In at least some embodiments, the computing system may use guide templates that define preferred or optimal settings to use for various video processing operations, including splicing and transcoding operations, in different batch processing scenarios or contexts. The guide templates may, for example, be stored in memory of the computing system, and the determination of first transcoding parameters may depend on the validation testing results, the video output requirements, and settings identified in the guide templates.

In operation 314, the computing system sends, to the selected processing server, a second request to generate an output video based on the video files of the new processing job. The computing system also sends the first transcoding parameters to the processing server. In particular, the second request includes an indication of the first transcoding parameters for use in batch processing of the video files.

Figure 4:
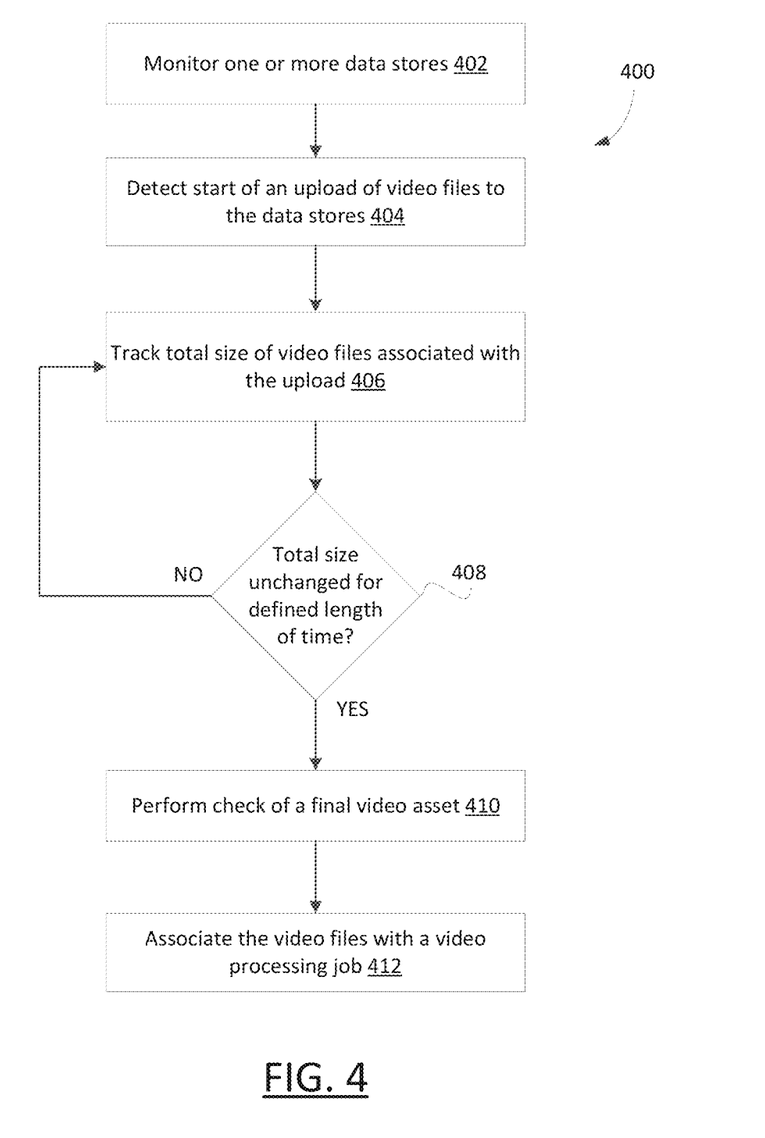
FIG. 4 shows, in flowchart form, an example method for generating processing job data for a video processing job.

Reference is made to FIG. 4, which shows, in flowchart form, an example method 400 for generating processing job data for a video processing job. As a specific and non-limiting example, the method 400 may be implemented as part of an automated process for detecting an upload of video files, identifying a grouping of the uploaded video files for associating with a new video processing job, and assigning the new processing job to a suitable video processing server.

Operations 402 and onward may be performed by one or more processors of a computing device such as, for example, the processor 200 (FIG. 2A) of one or more suitably configured instances of the example computing device 105 (FIG. 2A). In at least some embodiments, the method 400 may be performed by a computing system. In particular, a server (such as the management server 150 of FIG. 1, in some embodiments) that is configured to manage a plurality of video processing jobs may perform all or part of the operations of method 400. The operations of method 400 may be performed in addition to, or as alternatives of, one or more of the operations of method 300.

In operation 402, the computing system monitors one or more data stores. The data stores may, for example, be databases storing a plurality of video files. The video files may be associated with one or more video processing jobs. In at least some embodiments, the data stores may be designated locations that are configured to receive uploads of video files for batch processing. For example, the data stores may correspond to online repositories to which video creators can upload video files of specific types or subject matter (e.g., video depositions). By monitoring the data stores for one or more defined trigger events, the computing system may automatically determine when video files associated with a new processing job have been uploaded for batch processing.

Various different trigger events may be used for detecting an upload of video files. In operation 404, the computing system detects the start of an upload of video files to at least one of the data stores. For example, the computing system may detect that the total size or number of video files in a data store has begun to increase. In order to detect completion of the video upload, the computing system may monitor one or more variables associated with the video files in the data store.

The computing system tracks a total size of video files in the data store in operation 406, and determines, in operation 408, whether the total size of the video files is unchanged for a defined length of time. That is, a certain length of time may be defined, and the computing system may determine whether the total size of uploaded files remains substantially constant (or stable) for at least the defined length of time. If the amount of detected change in total size is less than a threshold amount, the computing system may determine that the total size has remained substantially constant. In a similar manner, the number of video files in the data store may be monitored to determine whether any change has occurred within a defined length of time.

Additionally, or alternatively, completion of an upload of a group of video files may be detected by the presence of a single video asset. In operation 410, the computing system performs check for a final video asset. In particular, the computing system may determine, based on file names, metadata, and/or accompanying inventory list for the video files, that a final video asset associated with the video upload is present in the data store. For example, the computing system may identify common parameters in the file names or metadata of the uploaded video files and determine that the files are related and/or components of a single video asset.

In operation 412, the computing system associates the video files with a video processing job. In particular, the computing system may internally associate the video files of the detected upload to a new batch video processing job. The new processing job and associated processing job data may then be communicated to a suitable processing server that may be identified in accordance with the techniques described above.

Figure 5:
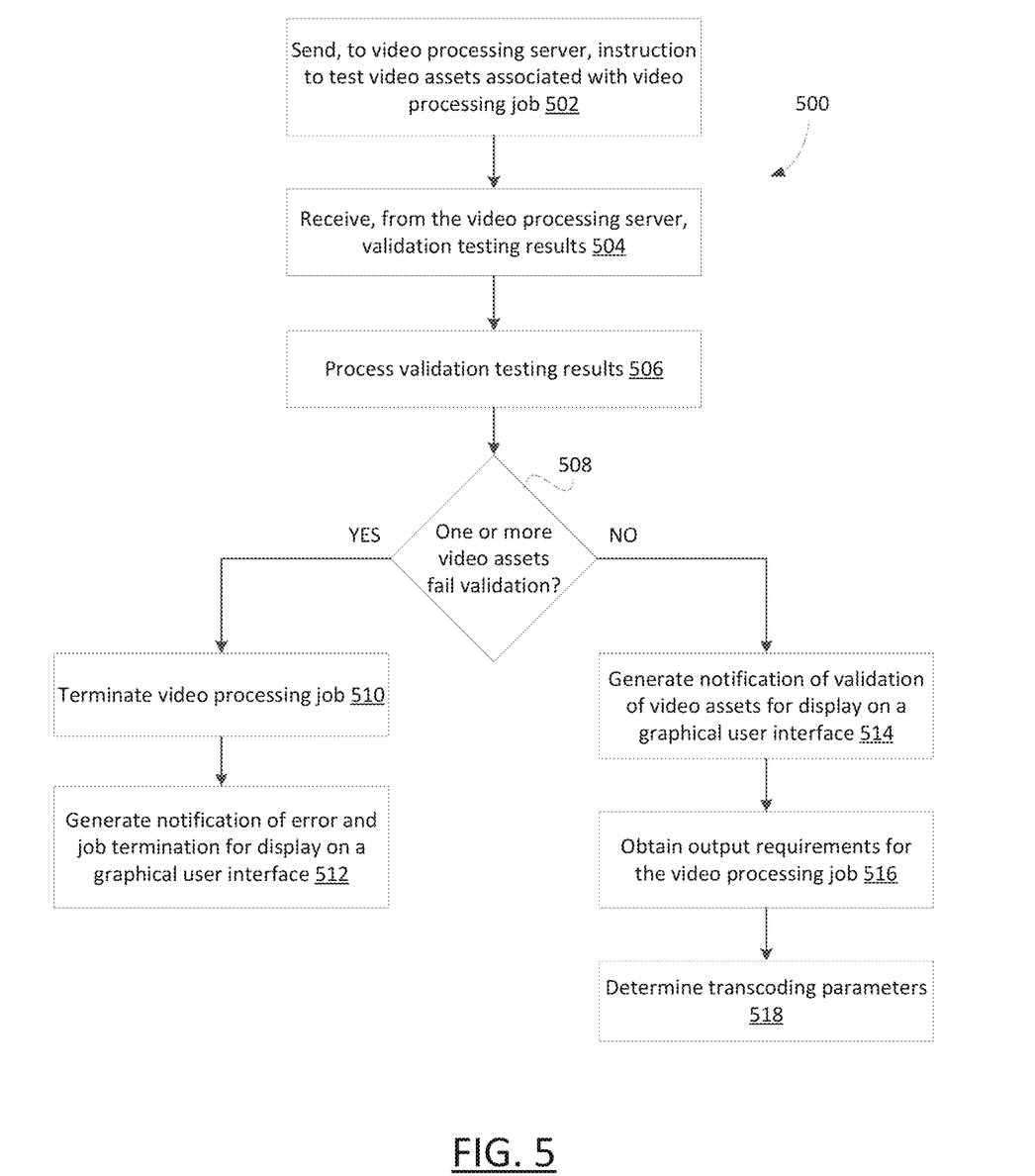
FIG. 5 shows, in flowchart form, an example method for determining transcoding parameters for input video files associated with a video processing job.

Reference is made to FIG. 5, which shows, in flowchart form, an example method 500 for determining transcoding parameters for input video files associated with a video processing job. As a specific and non-limiting example, the method 500 may be implemented as part of an automated process for processing, splicing, and transcoding combinations of video files that are part of a collection of videos. An output video that is produced based on the method 500 may comply with requirements of videos for one or more specific applications (e.g., video depositions). For example, an output video may have video properties that are consistent with specific video resolution and compression requirements.

Operations 502 and onward may be performed by one or more processors of a computing device such as, for example, the processor 200 (FIG. 2A) of one or more suitably configured instances of the example computing device 105 (FIG. 2A). In at least some embodiments, the method 500 may be performed by a computing system. In particular, a server (such as the management server 150 of FIG. 1, in some embodiments) that is configured to manage a plurality of video processing jobs may perform all or part of the operations of method 500. The operations of method 500 may be performed in addition to, or as alternatives of, one or more operations of methods 300 and 400.

In operation 502, the computing system sends, to a video processing server, instructions to test video assets associated with a video processing job. The video processing server may be a server that has been selected as being suitable for handling the video processing job. The instructions may be included in a request to the selected processing server to perform validation testing of the video files of the video processing job.

In operation 504, the computing system receives, from the video processing server, validation testing results for the video assets. The validation testing is performed by the video processing server to determine whether there are any errors or defects associated with one or more of the video files. The validation testing may be performed, for example, using designated software-based video examination tools that is accessible to the video processing server. In at least some embodiments, the validation testing results may include indications of video properties of the video files associated with the video processing job.

In operation 506, the computing system processes the validation testing results and in operation 508, the computing system determines whether one or more of the video assets has failed validation testing. In particular, the computing system determines, based on the validation testing results, whether an error or defect has been detected for one or more of the video files of the video processing job.

If at least one of the video assets fails validation testing, the computing system terminates the video processing job in operation 510. That is, the computing system may determine, based on the validation testing results, that at least one of the video files is defective and in response, the computing system may terminate the video processing job. Various rules may be defined for determining when a video file is defective. For example, a video file may be determined to be defective if a threshold number of errors is detected during validation testing or if particular types of errors/defects are detected. The validation testing results may indicate the number and details of the detected errors/defects.

In some embodiments, as an alternative to terminating a video processing job, the computing system may attempt to reprocess the job. For example, if one or more defective files are detected, the computing system may send an instruction message to the video processing server to obtain the video files of the video processing job again and perform operations for processing/testing the video files as described above.

Upon termination due to defective file(s), the computing system generates a notification indicating one or more video file errors and job termination in operation 512. The notification may be communicated to client devices for display thereon. In particular, the notification may be included in display data for presenting on a user interface associated with a video processing management service.

If, on the other hand, all of the video assets are validated or determined to have passed the tests, the computing system generates notification of the validation of video assets in operation 514. The notification may be communicated to client devices for display thereon. In particular, the notification may be included in display data for presenting on a user interface associated with a video processing management service.

The computing system then obtains output requirements data for the video processing job in operation 516, and the computing system determines transcoding parameters in operation 518. Operations 516 and 518 may be performed according to techniques described above.

Figure 6:
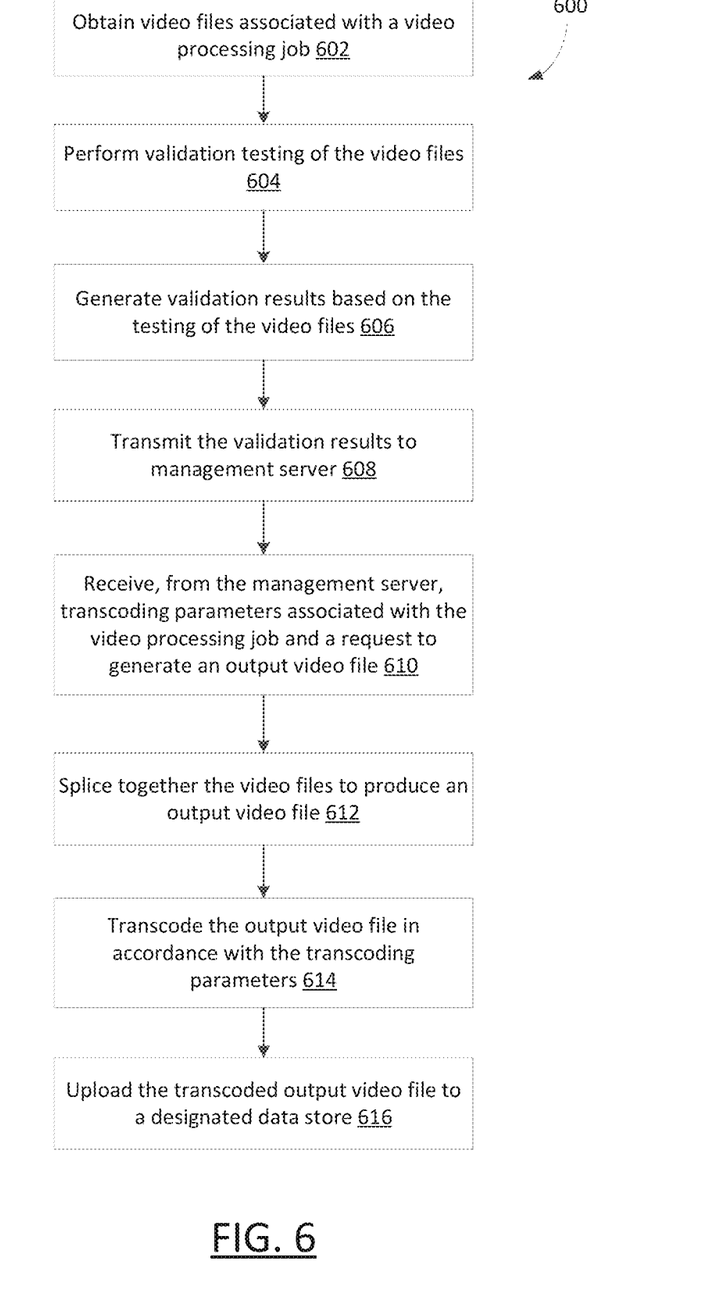
FIG. 6 shows, in flowchart form, an example method for processing and testing input video files associated with a video processing job.

Reference is made to FIG. 6, which shows, in flowchart form, an example method 600 for processing and testing input video files associated with a video processing job. As a specific and non-limiting example, the method 600 may be implemented as part of an automated process for processing, splicing, and transcoding combinations of video files that are part of a collection of videos. An output video that is produced based on the method 600 may comply with requirements of videos for one or more specific applications (e.g., video depositions). For example, an output video may have video properties that are consistent with specific video resolution and compression requirements.

Operations 602 and onward may be performed by one or more processors of a computing device such as, for example, the processor 200 (FIG. 2A) of one or more suitably configured instances of the example computing device 105 (FIG. 2A). In at least some embodiments, the method 600 may be performed by a computing system. In particular, a server (such as the video processing server 160 of FIG. 1, in some embodiments) that is configured to process input video files of a video processing job in order to generate one or more output videos may perform all or part of the operations of method 600.

In operation 602, the processing server obtains video files associated with a video processing job. In particular, the processing server may receive, from a video processing management entity, instructions to obtain one or more video files of a video processing job that has been assigned to the processing server. The processing server may access a database, such as an online repository, storing the video files and download copies of the files.

In operation 604, the processing server performs validation testing of the video files. The testing may be performed using designated software tools that are either locally available or remotely accessible by the processing server. The processing server generates validation testing results based on the testing of the video files, in operation 606.

In operation 608, the processing server transmits the validation testing results to the video processing management entity (i.e., a management server). In operation 610, the processing server receives, from the management server, transcoding parameters associated with the video processing job and a request to generate an output video file for the processing job based on the input video files obtained in operation 602. In at least some embodiments, the processing server performs one or more video processing operations, such as video splicing and transcoding, for the input video files. The operations may be performed in accordance with the transcoding parameters received from the management server.

By way of example, the processing server splices together the input video files in operation 612. The processing server may seamlessly splice together all video files of the processing job according to a defined order. The order may be determined, for example, based on information, such as file names, metadata, or an inventory list, associated with the video files of the processing job.

In operation 614, the processing server transcodes the video assets in accordance with the transcoding parameters. That is, once the input video files have been spliced together as required, the processing server transcodes the newly created video assets using the transcoding parameters obtained from the management server. The transcoded video assets have the video/audio output formats, resolutions, and/or compression ratios that are required for the processing job.

The management server may periodically query the processing server to determine whether the transcoding of the video assets has completed. Once the transcoding operations are completed, the processing server may be instructed (by the management server) to test the validity, quality and integrity of the output video assets. This testing may be performed using the same or other video examination software tools.

Based on validation results, if one or more video assets fail the testing, the management server may terminate the video processing job and notify a user of the validation failure/termination (e.g., updating a user interface associated with the management server and/or for managing video processing jobs). If, on the other hand, all output video assets within the video processing job are determined to be valid, the management server may notify the user of validation success (e.g., indicating that the video assets are valid).

In operation 616, the processing server uploads the output video assets to a designated data store. The management server may, for example, send an instruction message to the processing server to upload the output video assets to a specific data store and upon receiving such message, the processing server may initiate upload of the video assets. Once the uploads are completed, the processing server may notify the management server of the completion and suitable notifications indicating completion of the video processing job may be generated and communicated to end users (e.g., client devices). In particular, push notifications (or similar messages) may be generated and transmitted to client devices via a user interface for managing video processing jobs. In some embodiments, the management server may be configured to move or copy the video assets of the video processing job from the designated data store to a particular archival-optimized storage solution.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A computing device comprising:
    a processor;
    a communications module coupled to the processor; and
    a memory coupled to the processor, the memory storing instructions that, when executed, configure the processor to:
        obtain video data for a first set of video files, wherein the obtaining includes:
            monitoring one or more data stores configured for storing video files;
            detecting a trigger event in connection with the one or more data stores; and
            in response to detecting the trigger event, retrieving video data associated with the first set of video files from the one or more data stores;
        generate processing job data for a first video processing job based on the video data for the first set of video files;
        identify a first processing server having a capacity for handling the first video processing job;
        send, to the first processing server, the processing job data for the first video processing job and a first request to validate the video data for the first set of video files;
        receive, from the first processing server, validation testing results in connection with the first set of video files;
        determine first transcoding parameters for the first set of video files based on the validation testing results and output requirements data for the first video processing job; and
        send, to the first processing server, a second request to generate an output video based on the first set of video files, the second request including an indication of the first transcoding parameters.

2. The computing device of claim 1, wherein the first transcoding parameters comprise settings for use in performing at least one of:
    splicing together two or more of the video files of the first set; or
    converting at least one of the video files of the first set to a target format.

3. The computing device of claim 1, wherein detecting the trigger event comprises detecting a start of an upload of at least one video file to the one or more data stores.

4. The computing device of claim 1, wherein detecting the trigger event further comprises detecting completion of the upload based on determining that total size of uploaded files remains substantially constant for at least a defined length of time.

5. The computing device of claim 1, wherein the validation testing results comprise, for each of one or more of the video files of the first set, at least one of: video display resolution; video codecs; audio codecs; or video compression settings.

6. The computing device of claim 1, wherein identifying the first processing server comprises determining, for each of a plurality of remote computing systems, a current processing capacity of the remote computing system.

7. The computing device of claim 6, wherein determining the current processing capacity of the remote computing system comprises sending, to the remote computing system, a query for obtaining at least one of processing power or available memory associated with the remote computing system.

8. The computing device of claim 1, wherein generating the processing job data comprises determining that the first set of video files is associated with a same processing job based on at least one of:
    metadata associated with the video files of the first set;
    file names of the video files of the first set; or
    an inventory list identifying constituent video files of a desired output video.

9. The computing device of claim 1, wherein the instructions, when executed, further configure the processor to:
    determine, based on the validation testing results, that at least one of the video files of the first set is defective; and
    in response to determining that the at least one video file is defective, terminate the first video processing job.

10. A computer-implemented method, comprising:
    obtaining video data for a first set of video files, wherein the obtaining includes:
        monitoring one or more data stores configured for storing video files;
        detecting a trigger event in connection with the one or more data stores; and
        in response to detecting the trigger event, retrieving video data associated with the first set of video files from the one or more data stores;
    generating processing job data for a first video processing job based on the video data for the first set of video files;
    identifying a first processing server having a capacity for handling the first video processing job;
    sending, to the first processing server, the processing job data for the first video processing job and a first request to validate the video data for the first set of video files;
    receiving, from the first processing server, validation testing results in connection with the first set of video files;
    determining first transcoding parameters for the first set of video files based on the validation testing results and output requirements data for the first video processing job; and
    sending, to the first processing server, a second request to generate an output video based on the first set of video files, the second request including an indication of the first transcoding parameters.

11. The method of claim 10, wherein the first transcoding parameters comprise settings for use in performing at least one of:
splicing together two or more of the video files of the first set; or
converting at least one of the video files of the first set to a target format.

12. The method of claim 10, wherein detecting the trigger event comprises detecting a start of an upload of at least one video file to the one or more data stores.

13. The method of claim 10, wherein detecting the trigger event further comprises detecting completion of the upload based on determining that total size of uploaded files remains substantially constant for at least a defined length of time.

14. The method of claim 10, wherein the validation testing results comprise, for each of one or more of the video files of the first set, at least one of: video display resolution; video codecs; audio codecs; or video compression settings.

15. The method of claim 10, wherein identifying the first processing server comprises determining, for each of a plurality of remote computing systems, a current processing capacity of the remote computing system.

16. The method of claim 15, wherein determining the current processing capacity of the remote computing system comprises sending, to the remote computing system, a query for obtaining at least one of processing power or available memory associated with the remote computing system.

17. The method of claim 10, wherein generating the processing job data comprises determining that the first set of video files is associated with a same processing job based on at least one of:
metadata associated with the video files of the first set;
file names of the video files of the first set; or
an inventory list identifying constituent video files of a desired output video.

18. The method of claim 10, further comprising:
determine, based on the validation testing results, that at least one of the video files of the first set is defective; and
in response to determining that the at least one video file is defective, terminate the first video processing job.

* * * * *